United States Patent Office 3,123,591
Patented Mar. 3, 1964

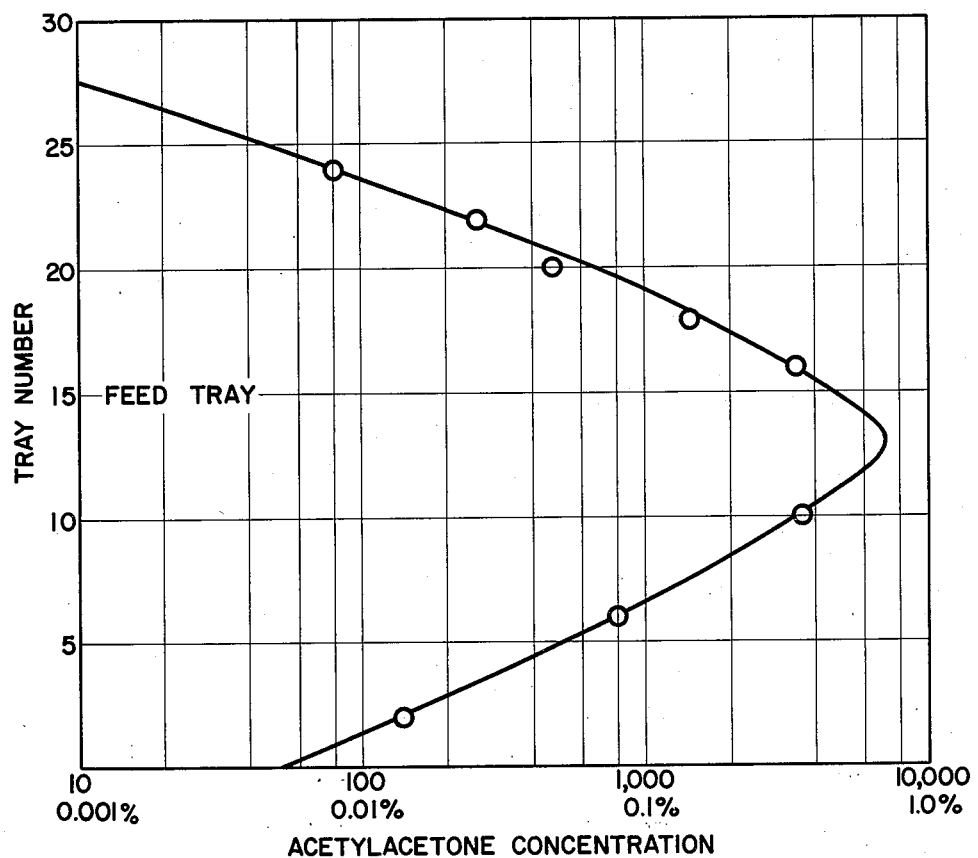

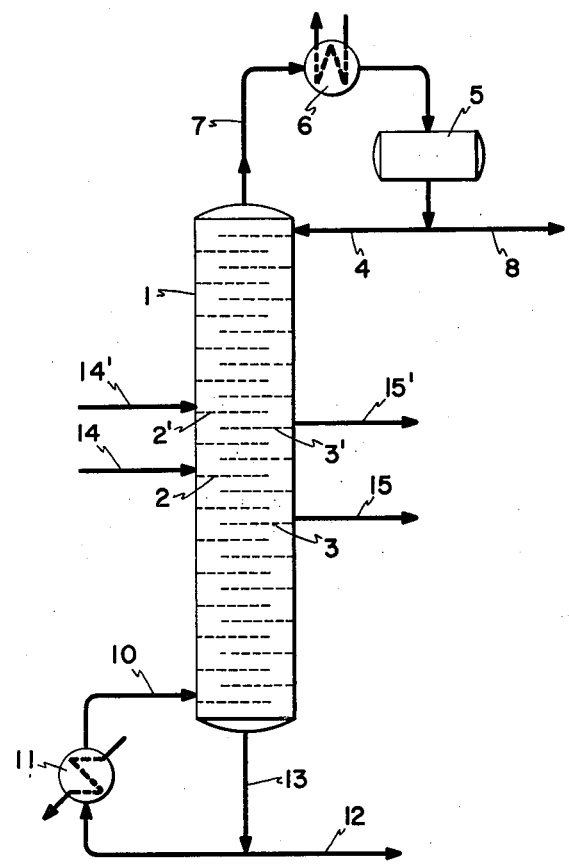
FIG.-II
JAMES F. ROSS INVENTOR
BY *L. C. Hasan*
PATENT ATTORNEY

3,123,591
FRACTIONATION OF POLYMERIZATION DILUENT CONTAINING ACETYLACETONE
James F. Ross, Baton Rouge, La., assignor to Esso Research and Engineering Company, a corporation of Delaware
Filed June 15, 1959, Ser. No. 820,485
5 Claims. (Cl. 260—93.7)

This invention relates to an improved method of fractionating the polymerization diluent from the low pressure polymerization of alpha olefins. More particularly it relates to a process of this nature wherein a diluent of a lower alkanol, xylene, and acetylacetone is fractionated in a tower with an acetylacetone-rich xylene sidestream being withdrawn from the tower.

The low pressure polymerization of alpha olefins with catalyst systems made up of a partially reduced, heavy, transition metal compound and a reducing metal-containing compound to high density, often isotactic, high molecular weight, solid relatively linear products has been assuming ever increasing importance and is now well known.

For the purpose of convenience details of the low pressure catalytic process and the products obtained thereby are presented below, although it should be realized that these by themselves constitute no part of this invention.

The alpha olefinic feeds utilized in polymerization and copolymerization include $C_2$–$C_6$ olefins, e.g., ethylene, propylene, butene-1, hexene-1, etc. with ethylene and propylene preferred. The process is described in the literature, e.g., see U.K. Patent 810,023 and "Scientific American," September 1957, pages 98 et seq.

In this process the polymers are prepared by polymerizing the monomer with the aid of certain polymerization catalysts. The catalysts are solid, insoluble reaction products obtained by partially reducing a heavy metal compound of a group IV–B, V–B, and VI–B metal of the periodic system, such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to

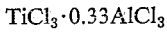

thus containing cocrystallized $AlCl_3$. (For further details see copending U.S. application Serial No. 578,198, filed April 6, 1956, and Serial No. 766,376, filed October 19, 1958.) The product is then activated with an aluminum alkyl compound corresponding to the formula RR'AlX. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride

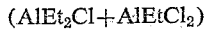

aluminum triisobutyl, with the first preferred.

The monomer is then contacted with the resulting catalyst in the presence of xylene as a preferred diluent. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a $C_1$ to $C_3$ alkanol such as methanol or isopropyl alcohol desirably in combination with a chelating agent such as acetylacetone is normally added to the reaction mixture for the purpose of dissolving and deactivating the catalyst, removing catalyst residues from the polymer, and for precipitating the polymer product from solution.

The resultant chelating agent, alkanol-aromatic mixture is separated from the precipitated polymer by conventional means such as filtration or centrifuging.

The polymers produced have number average molecular weights in the range of about 100,000 to 300,000 or even as high as 3,000,000 as determined by the intrinsic viscosity method using the I. Harris correlation (J. Polymer Science, 8, 361, 1952). The polymers can have a high degree of crystallinity and a low solubility in n-heptane.

It is to be understood that the term "low pressure" polymer as used herein connotes material prepared in the indicated manner and includes homo- and copolymers.

In the process it is necessary to rid the xylene diluent of acetylacetone before it can be recycled because the acetylacetone is a polymerization poison at levels above 10 p.p.m. Acetylacetone build up in recycled alkanol wash liquid is also untenable because of the introduction of metallic impurities and discoloration into the polymer product. Thus, the acetylacetone cannot be allowed to go overhead or out of the bottom of the alcohol-diluent fractionator unless these streams are further processed to remove the acetylacetone. Treating these streams presents difficulties and wastes the potential chelating power of the acetylacetone removed. Separation of the xylene from the acetylacetone by distillation techniques presents difficulties because of their identical boiling points.

This invention provides an improved method of purifying the polymerization diluent. The method comprises fractionating the polymerization diluent mixture of alkanol, xylene and acetylacetone in a fractionation tower in which the mixture is fed into the tower preferably as a vapor. An acetylacetone-rich xylene sidestream, preferably liquid, is withdrawn from the tower at the point of substantially greatest acetylacetone concentration preferably below the point of entry of the feed. A substantially acetylacetone-free alkanol is thus recovered overhead from the tower and a substantially acetylacetone-free xylene is recovered as a bottoms fraction. The acetylacetone-rich xylene stream can be re-utilized for further deashing of polymer product in that step in the operation or the acetylacetone can be removed from the stream by treating with caustic or a chelatable compound, such as $Fe_2O_3$, and the xylene then returned to the fractionating tower. Further details follow.

The polymerization diluent-wash liquid mixture encountered in the process contains the lower alkanol, xylene and acetylacetone, usually in respective ranges of 30 to 70, preferably 40 to 60 wt. percent, 70 to 30, preferably 60 to 40 wt. percent, and 50 to 500, usually 100 to 300 p.p.m. by weight. The temperatures in the fractionating operation are in the ranges of 150° to 250° F. in the fractionator top, 280 to 450° F. at the fractionator bottom at pressures of 0 to 100 p.s.i.g.

The acetylacetone-rich xylene sidestream is withdrawn on the tray where the acetylacetone is a maximum, conveniently as close as one or two trays below the feed tray and usually within 5 trays of the feed tray. The actual design of the tower can be calculated for any given system with the sidestream preferably being withdrawn below the point of entry of the vapor feed. It is possible to adjust the operating conditions in the tower, such as by adjustment of top plate temperature, so as to cause the optimum point for sidestream withdrawal to move a few trays up or down the column so as, for instance, to make the optimum sidestream withdrawal point coincide with an existing tower nozzle. An acetylacetone profile showing the concentration in xylene in the sidestream from various trays is shown in the graph in the drawing, FIGURE I. A concentration of 2% to 3% acetylacetone in the sidestream is easily obtained and concentrations of as high as 10 wt. percent can be gotten.

The alkanol taken overhead and the xylene bottoms are substantially free of acetylacetone containing no more than about 10 p.p.m. by weight.

This invention will be better understood by reference to the flow diagram and the following examples.

*Example 1*

In the drawing, FIGURE II shows a flow diagram for separating the diluent mixture. This diluent mixture arises from the polymerization of propylene with an aluminum-reduced $TiCl_4$-aluminum triethyl catalyst. The alkanol-xylene-acetylacetone mixture containing 831 pounds per hour of methanol, 925 pounds per hour of xylene, and analyzing 350 p.p.m. by weight of acetylacetone is fed through line 14 into a 30 plate fractionation tower 1 at the fifteenth plate 2 above the bottom of the tower. The overhead vapor, in line 7, comprising 2066 pounds per hour of methanol and 167 pounds per hour of xylene, flows into condenser 6 and reflux drum 5. The reflux stream of 1235 pounds per hour of methanol and 100 pounds per hour of xylene is pumped back into the top of the tower through line 4. The bottoms product, consisting of 763 pounds per hour of xylene, is removed through lines 13 and 12. Heat is supplied to the column by means of the reboiler 11 and line 10. A liquid sidestream composed of 95 pounds per hour of xylene and 0.6 pound per hour of acetylacetone is withdrawn from tower 1 through line 15 at the twelfth plate 3 above the bottom of the tower. The tower is operated at a pressure of 3.7 p.s.i.g. in the tower overhead, which corresponds to an overhead temperature of 159° F. and a bottoms temperature of 310° F. The feed is introduced as a vapor at a temperature of 217° F.

Under this set of conditions, the methanol-rich tower overhead product contains less than 10 p.p.m. by weight of acetylacetone and is a suitable liquid for washing polymer. In addition, it does not turn red in the presence of iron or steel. The xylene tower bottoms product contains 40 p.p.m. by weight of acetylacetone, and after a simple water washing and drying, is a suitable polymerization diluent containing 3–5 p.p.m. by weight of acetylacetone.

*Example 2*

Under substantially identical conditions to those employed in Example 1, and in the same tower, but with no sidestream withdrawal of xylene-acetylacetone mixture, the methanol-rich overhead stream again contained less than 10 p.p.m. by weight of acetylacetone, and was suitable for washing polymer; but the xylene bottoms product analyzed 800 p.p.m. acetylacetone. This stream was unsuitable for use as a polymerization diluent, the stream turned dark red in steel lines and vessels, and required a severe caustic treatment prior to reuse as a polymerization diluent.

*Example 3*

Under conditions of tower temperature and pressure, feed rate, reflux rate and product rates essentially identical to those employed in Example 1, except that the feed contained 50–100 p.p.m. by weight of acetylacetone and the sidestream was withdrawn from a point slightly higher in column 1, specifically the eighteenth plate above the column bottom, 15', the following data were obtained:

| Sidestream, Percent of Feed | Acetylacetone, p.p.m. by weight | |
|---|---|---|
| | Sidestream | Bottoms |
| 0 | | 100–150 |
| 10 | 540–1,250 | 37–46 |
| 15 | | 11–28 |

These data show that more than a 10-fold improvement in acetylacetone cleanup is obtained by the process of this invention, even though the point of withdrawal was not at the optimum tray (refer to figure) and therefore an excessively large sidestream was required to reduce the concentration of acetylacetone to the desired limits. In these cases, the methanol-rich overhead product contained 0–3 p.p.m. by weight of acetylacetone.

*Example 4*

In this example the feed rate and composition is essentially identical to that given in Example 1, however, the feed point to the same tower 1 is relocated so as to enter the tower at the nineteenth tray above the bottom, 2'. The sidestream is withdrawn from line 15' located on the eighteenth tray from the tower bottom. Under the same conditions of heat supply and reflux ratio as in Examples 1 and 2, a liquid sidestream is withdrawn from line 15' which consists of 29.5 pounds per hour of xylene and 0.6 pound per hour of acetylacetone. The xylene bottoms product consists of 798 pounds per hour of xylene analyzing 9 p.p.m. by weight of acetylacetone. The overhead methanol-rich stream consists of 830 pounds per hour methanol, 97 pounds per hour xylene, and analyzes 15 p.p.m. by weight of acetylacetone. The sidestream, if handled exclusively in alloy equipment, for example, type 316 stainless steel, does not discolor and is suitable for return to the polymerization process to aid in deashing polymers.

As stated previously the acetylacetone-rich xylene sidestream can be re-utilized to removed catalyst residues from the polymer. Alternatively, the acetylacetone can be removed from the sidestream by an operation such as treatment with caustic and the xylene recycled to the fractionation tower.

It is also possible to modify the process of this invention somewhat so as to simultaneously remove water and acetylacetone as a sidestream and then treating the latter with a hydroxide solution. The sidestream can then be returned to the tower.

The advantages of this invention will be apparent to those skilled in the art. The lower alkanol and xylene are obtained in condition for re-use. The acetylacetone-rich sidestream can also be re-used for additional deashing. Since acetylacetone is a rather expensive chemical this results in an economic advantage for the process.

It is to be understood that this invention is not limited to the specific examples which have been offered merely as illustrations and that modifications may be made without departing from the spirit of the invention.

What is claimed is:

1. In a process for polymerizing a $C_2$–$C_6$ alpha olefin in the presence of a catalyst containing a partially reduced, heavy, transition metal halide and an aluminum alkyl compound in a xylene diluent, wherein a $C_1$ to $C_3$ alkanol is added to the reaction system to precipitate polymer product, and acetylacetone is also added to remove catalyst residues from the polymer followed by the separation of the resultant alkanolxylene-acetylacetone mixture therefrom the improved method of purifying this mixture, in which the alkanol, xylene and acetylacetone are present respectively in amounts of from 30 to 70 wt. percent, 70 to 30 wt. percent, and 50 to 500 p.p.m. by weight which comprises feeding the mixture in the vapor form into a fractionation tower at a point intermediate the ends, fractionating the mixture to withdraw a liquid acetylacetone-rich xylene sidestream from the tower at the point of substantially greatest acetylacetone concentration and below the entry of the vapor feed, taking overhead a substantially acetylacetone-free alkanol, removing a substantially acetylacetone-free xylene bottoms and utilizing the acetylacetone rich sidestream to further remove catalyst residues from the polymer.

2. The process of claim 1 in which the alkanol is methanol.

3. The process of claim 1 in which the alkanol is isopropanol.

4. The process of claim 1 in which the acetylacetone is removed from the acetylacetone-xylene sidestream and the xylene is recycled to the fractionation zone.

5. The process of claim 1 in which the overhead alkanol and the bottoms xylene contain no more than about 10 p.p.m. by weight of acetylacetone.

References Cited in the file of this patent
UNITED STATES PATENTS

| | | |
|---|---|---|
| 2,618,590 | Unger et al. | Nov. 18, 1952 |
| 2,638,440 | Drout et al. | May 12, 1953 |
| 2,890,214 | Brightbill et al. | June 9, 1959 |
| 2,901,405 | Venis | Aug. 25, 1959 |
| 2,921,057 | Mertzweiller | Jan. 12, 1960 |
| 2,955,107 | Lovett et al. | Oct. 4, 1960 |

OTHER REFERENCES

Elements of Fractional Distillation, Robinson et al., 4th edition, McGraw-Hill Company, New York, New York (1950), pages 245, 249 and 334.